United States Patent [19]

Tate

[11] 4,120,738

[45] Oct. 17, 1978

[54] LIGHT WEIGHT AGGREGATE AND METHOD FOR MAKING SAME

[75] Inventor: Dan C. Tate, Canton, N.C.

[73] Assignee: Champion International Corporation, Stamford, Conn.

[21] Appl. No.: 841,011

[22] Filed: Oct. 11, 1977

[51] Int. Cl.$^2$ .............................................. C08L 97/00
[52] U.S. Cl. ........................ 106/288 Q; 106/123 LC; 106/309; 106/DIG. 1
[58] Field of Search ............. 106/DIG. 1, 288 Q, 309, 106/288 B, 123 LC

[56] References Cited

U.S. PATENT DOCUMENTS

| | | | |
|---|---|---|---|
| 2,948,948 | 8/1960 | Duplen, Jr. et al. | 106/DIG. 1 |
| 3,030,222 | 4/1962 | Eichenlaub | 106/309 |
| 3,785,840 | 1/1974 | Minnick et al. | 106/DIG. 1 |

*Primary Examiner*—Winston A. Douglas
*Assistant Examiner*—J. V. Howard
*Attorney, Agent, or Firm*—Evelyn M. Sommer

[57] ABSTRACT

A light weight aggregate is described which is formed of fly ash and solids derived from the caustic extract filtrate produced in a kraft pulping process. In a method for producing the light weight aggregate caustic extract filtrate produced in a kraft pulping process is concentrated to a desired level. The concentrated filtrate is then mixed with water and fly ash to produce a green agglomerate which is extruded into discrete pellets. The pellets are then burned to produce a light weight high strength aggregate.

7 Claims, No Drawings

LIGHT WEIGHT AGGREGATE AND METHOD FOR MAKING SAME

FIELD OF THE INVENTION

This invention relates to a light weight aggregate and a method for making same. More specifically, this invention relates to a light weight aggregate formed of waste product such as fly ash and waste liquor from a pulp mill.

BACKGROUND OF THE INVENTION

Light weight aggregates formed of fly ash and waste liquor from a pulp mill have been described in the art. For example, in the U.S. Pat. No. 2,833,659 to Bauer, a process is described wherein a small amount of crude waste liquor, such as lignosulphonic acid compounds produced during the manufacture of chemical wood pulp, is mixed with fly ash and clay to form a ceramic material.

In U.S. Pat. No. 2,576,565 to Brown a brick-forming process is described wherein fly ash and slag are wet mixed with a small amount of alkaline earth metal salt of lignosulphonic acid with the latter being used as a binder.

In U.S. Pat. No. 3,862,854 to Zeigerson, halogenated sulfurated lignins are disclosed as flame proofing agents and as ingredients in binders.

These prior art patents describe several techniques for use of lignin produced from wood pulping operations which involve a sulfite or acid process. I have discovered that the use of chlorinated lignins from a kraft or sulfate process has unexpected properties for use in producing light weight aggregate.

Summary of the Invention

In a process for producing a light weight aggregate in accordance with the invention, chlorinated lignins from the bleaching waste or caustic extract filtrate produced in the sulfate process of a wood pulp mill operation are used. The extracted chlorinated lignins are concentrated and combined with fly ash to produce a light weight aggregate.

The chlorinated lignin from the kraft or sulfate process contains a hardening agent which has been found to be particularly desirable and useful in producing a light weight aggregate. The chlorinated lignin improves the strength of the aggregate and acts as a cohesive binding agent. The resulting light weight aggregate has an advantageous high strength.

As described with reference to a preferred method for forming a light weight aggregate in accordance with the invention, a small amount of concentrated solution of caustic extract filtrate from a pulp mill bleaching waste is mixed with water and fly ash. The completed mixture is extruded to form pellets in which the chlorinated lignin in the caustic extract serves as a cohesive agent as well as a lubricant. The pellets are then burned to form a cohesive light weight aggregate. The concentrated chlorinated liquor is of sufficient concentration to support the combustion of the pellets.

It is, therefore, an object of the invention to provide a light weight aggregate and method of making same wherein the light weight aggregate exhibits a high strength and can be conveniently formed.

These and other objects and advantages of the invention can be understood from the following description of a preferred embodiment.

DESCRIPTION OF THE EMBODIMENT

In the formation of a light weight aggregate according to the present invention, pulp mill bleaching waste liquor is obtained from a kraft pulp process. Specifically, caustic extraction filtrate produced during the kraft pulping process is used. This filtrate includes dissolved chlorinated lignin.

The chlorinated lignin from kraft pulp is fundamentally different from the chlorinated lignin produced from sulfite pulp. Such difference can be observed because little of the kraft lignin dissolves during chlorination and subsequent wash, but enters into solution in the alkali stage employed in the kraft process. The main part of the acid and neutral sulfite pulp lignin, on the other hand, is rendered water soluble by chlorination, and only small quantities remain to be dissolved by the alkali.

Kraft pulp lignin, after being chlorinated, is dissolved in an alkali treatment. Part of the lignin is then precipitated by acids or other materials such as divalent or trivalent metal ions. The precipitate is then extracted by filtering. The remaining waste liquor is a caustic extract filtrate which includes dissolved lignins even at low pH levels. The caustic extract filtrate is characterized by its inclusion of dissolved kraft pulp lignin (chloro lignin) which is electro-phoretically immobilized at about a pH value of 3.0. This indicates the presence of acidic groups such as chloranilic acid which is particularly useful in the process of this invention as a hardening agent.

The caustic extract filtrate is then concentrated by evaporating the liquid. The concentration level of the remaining solids is selected in such manner that a subsequent mixing with fly ash can provide a homogeneous mixture. The concentration step may result in a caustic extract filtrate having a solid content in the preferred range from about 30.0% to about 45.0% by weight.

After concentration of the caustic filtrate, it is mixed with fly ash. The fly ash may be obtained from a variety of sources. Preferably the fly ash is obtained from a coal burning operation such as encountered in connection with an electric power plant. The fly ash further is preferably characterized by a fine powder form.

The fly ash is then mixed with water and the concentrated caustic extract filtrate. Generally, the amount of water added to the mixture is selected sufficiently high to enable a thorough mixture of the fly ash and caustic extract filtrate. The amount of water added is kept sufficiently low to preserve the viscosity of the mixture at a level sufficient to extrude the mixture into discrete agglomerate bodies. The mixture is preferably carried out in a manner whereby water is present in the rate of from 15.0% to about 20.0% by weight of the fly ash and with caustic extract filtrate from about 1.0% to about 1.5% by weight of the fly ash with the amount of the filtrate dependent upon its degree of concentration.

The resulting mixture has a green coloration and may then be formed into separate aggregate bodies by extrusion into pellets. The concentrated caustic extract filtrate serves as a lubricant while also improving the strength of the green aggregate.

The cohesive strength imparted by the lignin to the green aggregate can be observed in that the pellets do not readily break apart.

The green agglomerate pellets are then burned to form a hard finished aggregate. The liquor in the green aggregate supports the combustion so that a finished light weight high strength aggregate is obtained.

The following example is given in order to more clearly illustrate the invention and is in no way to be construed as limitative of the scope thereof.

EXAMPLE

A caustic extract filtrate from a kraft pulping process was concentrated by evaporating its water. The caustic extract had a pH of 11.5 to 11.8 with an average color of 28,000 ppm (parts per million), average total solids of 7,000 ppm, average suspended solids 80 ppm, a range of sodium of 1,110 to 2,000 ppm, calcium of 75 to 80 ppm and chlorine of 1,000 to 1,600 ppm. The filtrate was concentrated to a level of about 31.5% of solids by weight.

1,200 grams of fly ash from a coal burning boiler was mixed with water in an amount of 20.4% by weight of the fly ash and with the previously concentrated caustic extract in an amount of 1.5% by weight of the fly ash. The mixture resulted in a green agglomerate which was then extruded into small bodies.

The extruded agglomerate bodies produced green colored pellets of about ¼ inch to ⅜ inch diameter and ¼ inch to 1 inch long. These agglomerate pellets did not break apart when dropped from a height of two feet onto a concrete floor.

The pellets were then burned for fifteen minutes to produce a finished light weight aggregate. The finished aggregate required 200 inch pounds to break and a smooth break was obtained.

What is claimed is:

1. A method for producing a light weight aggregate comprising the steps of composing a mixture of caustic extract filtrate obtained from a kraft pulping process with fly ash and water to produce a wet agglomerate;

forming the wet agglomerate into discrete bodies; and burning said bodies to form said light weight aggregate.

2. The method as set forth in claim 1 wherein the forming step consists of extruding the wet agglomerate into pellets.

3. The method as set forth in claim 1 wherein the composing step includes the step of evaporating liquid from the caustic extract filtrate to obtain a desired concentraton of solids therein.

4. The method as set forth in claim 3 wherein the evaporating step provides a caustic extract filtrate having a concentration of solids in the range of from about 30.0% to about 45.0% by weight.

5. The method as set forth in claim 4 wherein the caustic extract filtrate has a concentration of about 31.5% solids.

6. The method as set forth in claim 1 wherein the composing step includes the mixture of water in an amount from about 15.0% to about 20.0% by weight of the fly ash and wherein the caustic extract filtrate is present in an amount of from about 1.0% to about 1.5% by weight of the fly ash with a concentration of solids in said caustic extract filtrate being in the amount of from about 30.0% to about 45.0% by weight in said filtrate.

7. A light weight aggregate made in accordance with the method of claim 1.

* * * * *